(12) United States Patent
Dillman et al.

(10) Patent No.: US 6,497,660 B1
(45) Date of Patent: Dec. 24, 2002

(54) ULTRASOUND IMAGING DEVICE

(75) Inventors: Richard F Dillman, Andover, MA (US); David G Miller, Andover, MA (US); Alexander Tykulsky, Carlisle, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/691,605

(22) Filed: Oct. 18, 2000

(51) Int. Cl.[7] .................................................. A61B 8/00
(52) U.S. Cl. ....................................... 600/437; 600/443
(58) Field of Search ................................. 600/437, 443, 600/447; 310/314–317

(56) References Cited

U.S. PATENT DOCUMENTS

| | | | | |
|---|---|---|---|---|
| 2,166,763 A | * | 7/1939 | Mason | ........................ 175/320 |
| 4,670,682 A | * | 6/1987 | Harnden, Jr. et al. | ........ 310/322 |
| 5,298,828 A | * | 3/1994 | Radanovich | ................. 310/319 |
| 5,913,823 A | * | 6/1999 | Hedberg et al. | ............. 600/443 |
| 6,241,676 B1 | * | 6/2001 | Savad | ......................... 600/447 |

* cited by examiner

*Primary Examiner*—Francis J. Jaworski
(74) *Attorney, Agent, or Firm*—John Vodopia

(57) ABSTRACT

An ultrasound imaging device having a bipolar transmitter to generate a bipolar voltage signal, a transducer to emit an ultrasound wave in response to the bipolar voltage signal, and a bias generator to bias the bipolar voltage signal prior to being received by the transducer so that the biased bipolar voltage signal maintains a same polarity as a poling polarity of the transducer throughout a transmit cycle of the ultrasound imaging device. By biasing the bipolar voltage signal to maintain a same polarity as the poling polarity of the transducer throughout the transmit cycle, the ultrasound imaging device prevents depoling of the transducer which could otherwise occur if the transducer is driven by a bipolar voltage signal which repeatedly has a polarity opposite to the poling polarity of the transducer.

22 Claims, 3 Drawing Sheets

ULTRASOUND IMAGING DEVICE

BACKGROUND OF THE INVENTION

1. Field of the Invention

The present invention relates to an ultrasound imaging device, and more particularly, to an ultrasound imaging device having a transducer, with a poling polarity, to emit ultrasound waves at an object to generate an image of the object, and which prevents depoling of the transducer. Generally, the object to be imaged is an organ of the human body.

2. Description of the Related Art

Ultrasound imaging devices utilize transducers which transform electrical energy into ultrasound and visa-versa. Such transducers are commonly used for non-destructive and non-invasive testing, such as for the examination of internal organs. Transducers, and more particularly, piezoelectric transducers, are often made of ceramic or a crystalline structure. These structures are expensive to grow and even more expensive to integrate with the necessary mechanical and electrical components required for ultrasound imaging. Medical ultrasound probes cost $10,000.00 and up.

Piezoelectric transducer are polarized. That is, the fine structure of the unit cells are oriented with an electric field at high temperatures during the manufacturing process thereof. As a result, when the voltage across the transducer is changed, the various unit cells in the crystal structure strain to produce a net displacement of the material, so as to emit a pressure wave at ultrasonic frequencies. Thus, as part of the normal manufacturing process, the ceramic or crystal structure is polarized. This transducer material process is called poling and produces a material that is called poled. If the material is not polarized, the transducer generally will not work, and the transducer is not piezoelectric anymore as it will not emit ultrasound when the voltage across the same is changed because the various unit cells in the structure behave randomly and the internal strains produce no external displacement. In effect, the various groups of unit cells in the volume of the material cancel each other out when you apply the voltage. The polarization of these materials is chiefly influenced by three variables: voltage; temperature; and time.

Historically, what has been done is to transmit a square pulse which goes from 0 volts and goes negative, perhaps down to −170 volts. The magnitude of the voltage is adjustable, but it always goes negative, so if you pole the transducer with a negative DC source, then when an ultrasonic imaging device transmits, there is merely a repeating of what was done when the transducer was manufactured, and the poling will be maintained.

More recently, it has been found advantageous to preferentially receive and display echo signals that arise because of the non linear properties of tissues or contrast agents. It is not desirable at times to use the simple square pulse. More complicated pulses are advantageous, and in particular, the simplest replacement pulse would be a square wave consisting of a negative going pulse immediately followed by an equal and opposite positive going pulse—or a positive going pulse followed by an equal and opposite negative going pulse. Such a simple pulse is called bipolar. However, any pulse with both positive and negative excursions is bipolar.

One motivation to use bipolar waveforms is to reduce the amount of waveforms exhibiting second harmonic of the fundamental frequency of the desired transmitted. It is ideal to transmit with no second harmonics, and then receive the second harmonic, so that the second harmonic that is received is solely caused by an object to be imaged or the tissue non-linearities in a patient. Another non-linear strategy is to sequentially transmit a first pulse, then receive and store data about the echoes thereof, then transmit an second inverted pulse, and then receive and add data about the echoes thereof to the data previously stored. The sum is zero if the ultrasound medium and target are linear any non zero values are due to non-linearities. Since a bipolar waveform with equal plus and minus excursions, as mentioned above, has two forms—one way to implement the pulse inversion strategy is to alternate between them.

There are other advantages of using bipolar waveforms other than non-linear imaging. For example, with a bipolar waveform having equal plus and minus excursions there are no audible noises that come out of the ultrasound imaging transducer, so that a patient cannot hear any sounds from the ultrasound imaging device at low frequencies. Particularly, if the ultrasound imaging device is to be applied to a patient's head, it is desirable that the patient should not hear the ultrasound wave generated to perform the imaging.

With bipolar pulses, a voltage, opposite from the voltage by which it was manufactured, is momentarily put across the ceramic. This may cause problems, such as depoling. Certainly, at a high enough voltage for a long enough time, and alternatively, also at a high enough temperature, problems occur in that the ceramic becomes depoled. This has not proven to be a significant concern with older lower-frequency transducers that use coarse elements. However, higher-frequency transducers are desired and are currently developed. As a transducer is designed to operate at higher and higher frequencies, thinner and thinner elements are required in the transducer and for a given voltage, that means that the electric field in the transducer gets higher and higher, so that the above-noted problems will only be aggravated. Additionally, different kinds of ceramic are being developed and may be extremely sensitive to depoling.

Transducer materials exhibit capacitor-like characteristics. The manufacturing operation involves applying a DC voltage to this capacitor-like structure at some specified temperature, so that each one of the unit cells in the material has a contributing dipole moment. It has a plus charge and a minus charge that are very close together, and if a field is applied and the temperature is raised, these dipoles will align with this applied external field. Then, when the transducer is cooled down and the external field is removed, the alignment remains, so that the transducer functions as a piezoelectric element. Manufacturing processes seek to align the polarity of the unit cells of the ceramic or crystal structure in a desired direction such that their strains are additive. Any external event which causes them to become randomly aligned, or less aligned would be considered a depoling event. Any external force acting on the transducer which causes it to lose its polarization causes the transducer to become less effective, and that is undesirable.

As noted previously, if the transducer is heated to a high temperature, or if a voltage opposite to the poling voltage is applied, depoling may occur. If either the heating or the application of the opposite voltage is performed for a long period of time, the depoling effect would be worse. Further, higher frequency transducer designs with thinner piezoelectrics increase the probability of depoling.

FIG. 1 shows a conventional ultrasound imaging device. A bipolar transmitter 110 generates a bipolar signal centered around 0 volts. The bipolar signal varies between +Xv and −Xv as shown in FIG. 2. A transmitter/receiver (T/R) switch 120 selectively connects a transducer 130 with the bipolar transmitter 110 during a transmit cycle and to a receiver 140 during a receive cycle, so that the receiver 140 is not damaged by the high voltage of the bipolar transmitter 110. During the receive cycle, any noise that is being emitted from the bipolar transmitter 110 is not seen by the receiver 140. Also, the signal to the receiver 140 is not shunted by the transmitter 110.

During the transmit cycle, the T/R switch 120 enables the transducer element 130 to receive the bipolar signal generated by the bipolar transmitter 110 so that the transducer 130 generates an ultrasound wave. During the receive cycle, the transducer 130 receives a reflected ultrasound wave back from the object being imaged and generates an image voltage signal based upon the received ultrasound wave. The T/R switch 120 enables the image voltage signal to be transmitted to the receiver 140 for processing.

The transducer 130 receives the bipolar voltage signal which goes to +Xv and then to −Xv, and this pattern may be repeated any number of times as a bipolar waveform. One disadvantage of this bipolar waveform is that if the transducer 130 is negatively polarized, when the bipolar voltage signal becomes positive, and is repeatedly positive over the life of the transducer 130, the material in the transducer 130 might depole. In this instance, the value of Xv may be 50 volts, for example. More versatile modalities require various pulse shapes or trains. The term bipolar pulse applies to any pulse which causes the transducer to be momentarily driven to a voltage opposite to the poling voltage. Such a voltage could depole the transducer if applied directly. Alternatively, if the transducer 130 is positively polarized, when the bipolar voltage signal becomes negative and is repeatedly negative over the life of the transducer 130, the transducer's ceramic will depole as well. Thus, in the conventional ultrasound imaging device 100, when the bipolar voltage signal repeatedly reaches a polarity opposite to that of the transducer 130, over time, the transducer 130 may become depoled, thereby losing effectiveness.

In the past, ultrasound imaging device vendors have not been aware of or concerned themselves with the problem of the depoling of the transducers used in the ultrasound imaging devices. The present inventors have realized that the risk of depoling may be reduced if a suitable DC bias is applied to the transducer in addition to the desired pulse. The addition of this DC bias introduces no sound energy, but safeguards the poling. Thus it is possible to generate and apply any arbitrary pulse shape without danger of depoling. For example, a gaussian windowed sine wave is one such pulse shape.

SUMMARY OF THE INVENTION

An ultrasound imaging device including a transducer with a poling polarity; a bipolar transmitter which generates a bipolar voltage signal; and a bias generator which biases the bipolar voltage signal, to generate a biased bipolar voltage signal without a polarity opposite to the poling polarity of the transducer, wherein the biased bipolar voltage signal drives the transducer to generate an ultrasound wave.

A further ultrasound imaging device is described that comprising a transducer with a poling polarity; a bipolar transmitter which generates a bipolar voltage signal; and a bias generator which biases the bipolar voltage signal, to generate a biased bipolar voltage signal from having a non-zero quiescent voltage, wherein the biased bipolar voltage signal drives the transducer to generate an ultrasound wave.

A method is also presented for generating an ultrasound wave from a transducer having a poling polarity to provide ultrasound imaging, the method comprising generating a biased bipolar voltage signal which maintains a polarity the same as the poling polarity of the transducer during a transmit cycle; and supplying the biased bipolar voltage signal to the transducer, which drives the transducer to generate the ultrasound wave.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
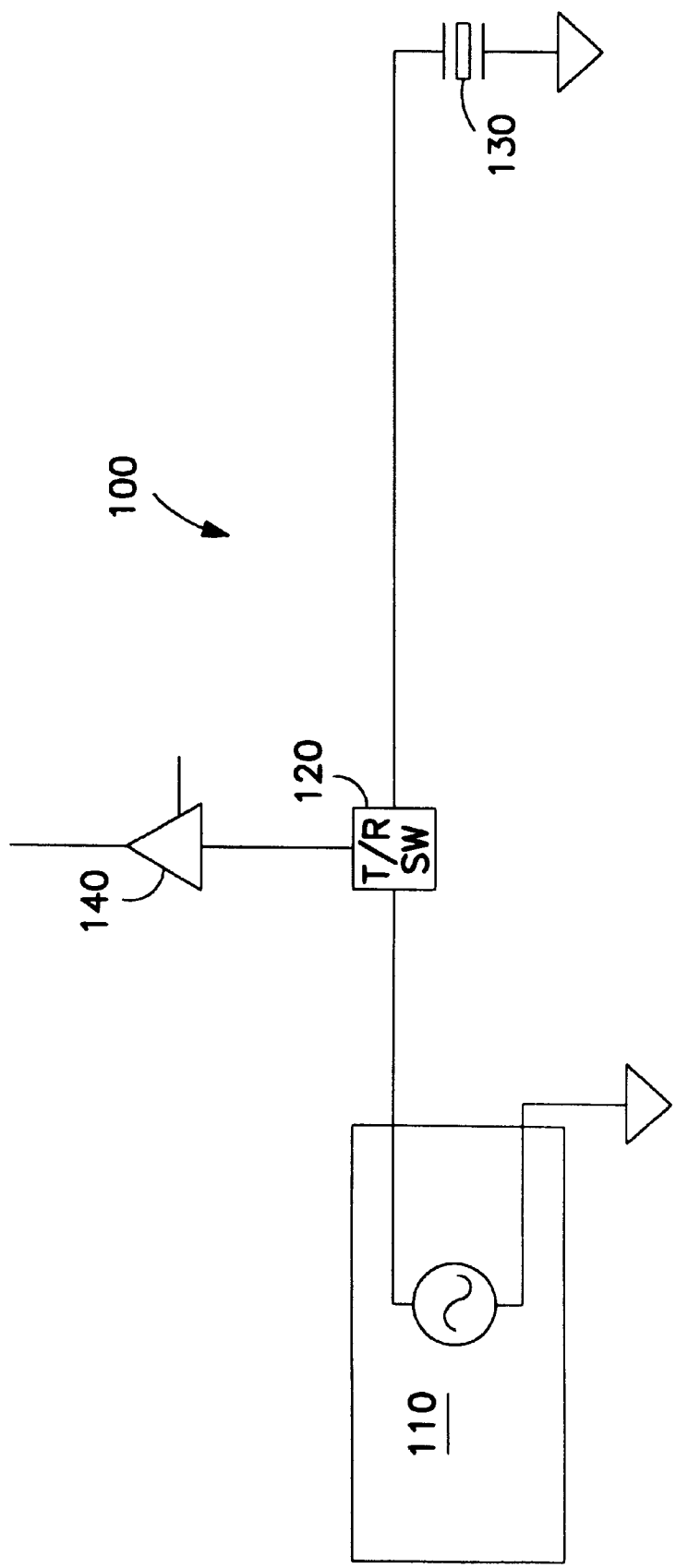
FIG. 1 is a schematic diagram of a conventional ultrasound imaging device.
Figure 2:
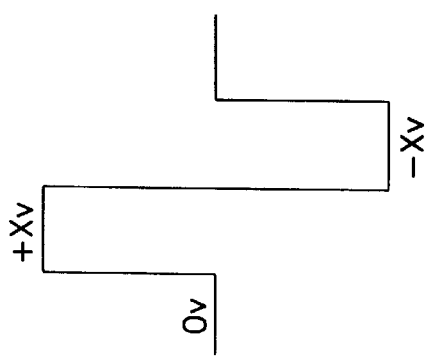
FIG. 2 is a waveform diagram of a bipolar voltage signal for driving a transducer of the ultrasound imaging device shown in FIG. 1.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

What is proposed in this invention is to bias the transducer such that even when a bipolar waveform is superimposed thereon, the transducer never receives a voltage at the opposite polarity from the poling polarity of the transducer.

According to the present invention, the driving signal applied to the transducer makes the transducer operational, yet minimizes depoling.

Instead of applying voltage having pulses below 0 volts and above 0 volts, the driving signal is quiescently biased at a same polarity as that of the transducer so that the driving signal never reaches the opposite polarity to that of the poling polarity of the transducer. Biasing the driving signal somewhat (on the order of 6V) is known for simplifying overall circuitry, but, to the knowledge of the present inventors, has never been applied to the extent necessary to alleviate depoling.

Figure 3:
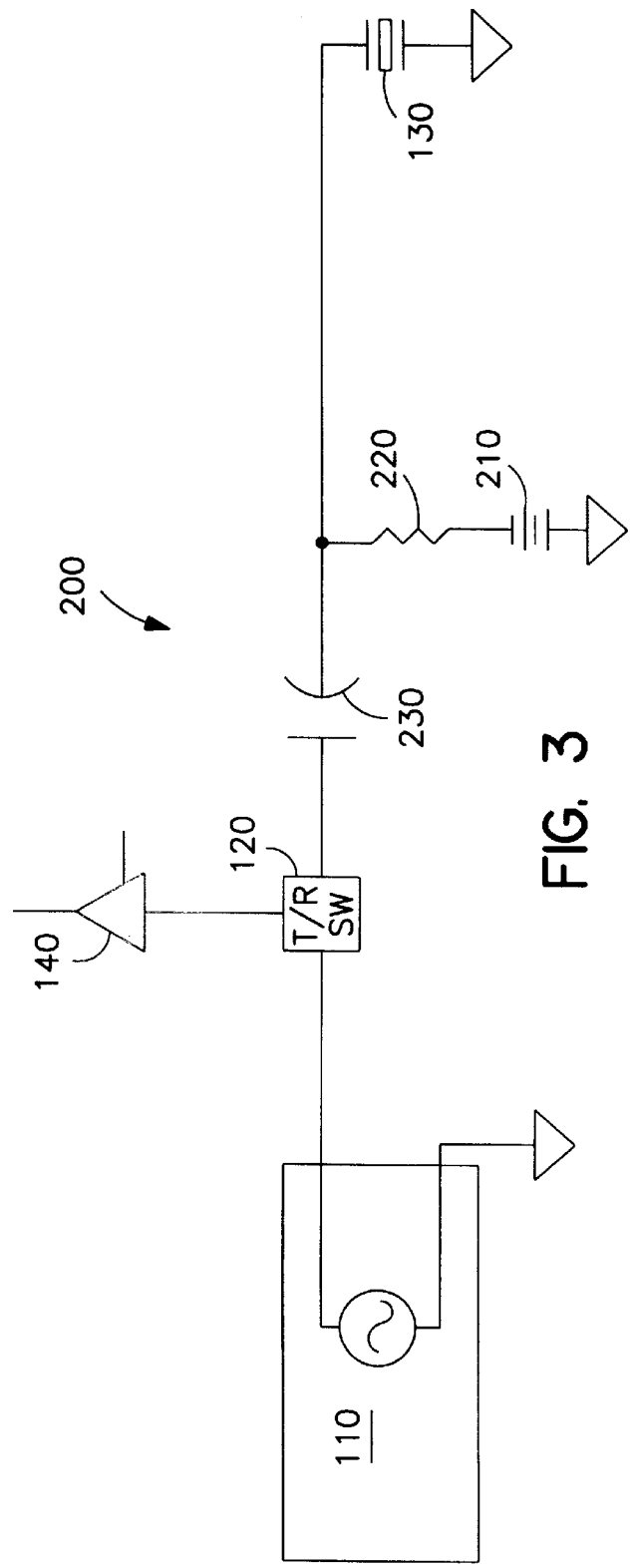
FIG. 3 is a schematic diagram of an ultrasound imaging device according to an embodiment of the present invention.

FIG. 3 shows an ultrasound imaging device 200 according to an embodiment of the present invention. The bipolar transmitter 110, the T/R switch 120, the transducer 130, and the receiver 140 operate in the same manner as that shown in FIG. 1. However, a bias generator 210 is added between the T/R switch 120 and the transducer 130. For illustrative purposes only, the transducer 130 is negatively polarized in this embodiment. A resistor 220 is connected between the bias generator 210 and the transducer 130. A capacitor 230 is connected at one end to the T/R switch 120 and at the other end to the bias generator 210 and the transducer 130, wherein the resistor 220 and the capacitor 230 form an RC circuit. The bias generator 210 is current limited, so that if there is some fault in the transducer element 130, the resistor 220 does not burn up. As a simplification, in systems with multielement transducers, all the resistors 220 may connect to only one bias generator.

During the transmit cycle, the bipolar transmitter 110 generates the bipolar voltage signals which are passed by the T/R switch 120. The bias generator 210, along with the resistor 220 and capacitor 230, shift the bipolar voltage signal negatively so that instead of sitting at 0 volts in the quiescent state, the bipolar voltage signal sits at least −Xv volts. The transducer element 130 generates ultrasound waves in response to the received biased bipolar voltage signal.

Figure 4:
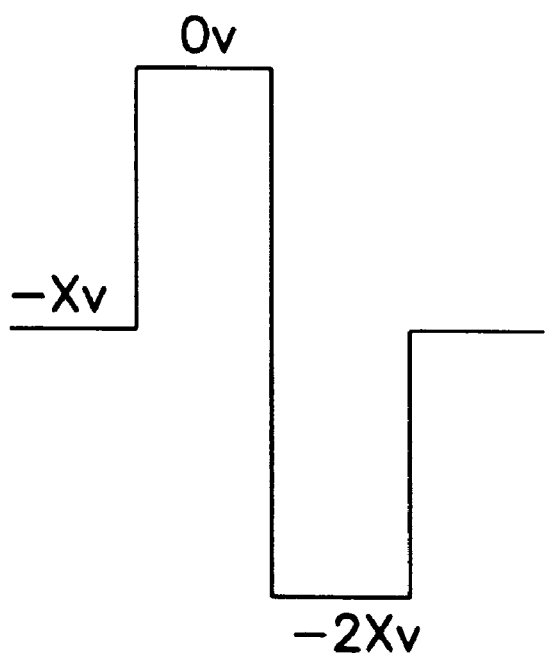
FIG. 4 is a waveform diagram of a biased bipolar voltage signal for driving a transducer of the ultrasound imaging device shown in FIG. 3.

FIG. 4 shows the biased bipolar voltage signal which is received by the transducer 130. As shown in FIG. 4, the biased bipolar voltage signal has a quiescent state at −Xv, a peak value of 0 volts and a minimum value of −2Xv. The biased bipolar voltage signal preferably should not cross 0 volts, as it is desirable not to have the biased bipolar voltage signal to have an opposite polarity to the poling polarity of the transducer 130. Thus, if the bias generator 210 has a voltage of greater than Xv, then the biased bipolar voltage signal would never reach zero, and such a result achieves the objects of the present invention.

Although FIG. 4 shows the biased bipolar voltage signal input to the transducer element as having a quiescent voltage of −Xv, a maximum value of 0 volts and a minimum value of −2Xv, the biased bipolar voltage signal may be shifted more negatively downward (the quiescent voltage being more negative than −Xv) so that the maximum voltage never reaches 0 volts.

In one example of the ultrasound imaging device shown in FIG. 3, the resistor 220 has a value of 10K ohm, the capacitor 230 has a value of 6800 pF, and the bias generator 210 varies between −6 and −85 volts. These values are used for example purposes only, and the disclosed ultrasound imaging device is not limited to such values.

In this element, the bipolar transmitter 110 has an AC generator which generates 0 to 85 volts peak to peak. Further, the bias generator 210 may be used to shift the biased bipolar voltage signal so as to always be more negative than −20 volts.

Once again, it should be noted that it does not matter whether the transducer 130 has a negative or positive poling polarity. The bias generator 210 is configured to bias the bipolar voltage signal to maintain the same polarity as the poling polarity of the transducer 130 throughout the transmit cycle. In this way, the unit cells of the crystal structure of the transducer 130 retain their original orientation. As a result, depolarization of the transducer 130, is prevented. Even a partial loss of the polarization of the transducer 130 would reduce the operating efficiency thereof.

Thus, if the transducer 130 has a negative poling polarity, the bias generator 210 biases the bipolar voltage signal to have a quiescent voltage at least as negative as a difference between a maximum value and 0 volts. On the contrary, if the transducer 130 has a positive poling polarity, the bias generator 210 biases the bipolar voltage signal in a positive direction by at least a difference between a minimum value of the bipolar voltage signal and 0 volts.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An ultrasound imaging device comprising:
    a transducer with a piezoelectric polarity;
    a bipolar transmitter which generates a bipolar voltage signal; and
    a bias generator which biases the bipolar voltage signal, to generate and prevent a biased bipolar voltage signal from having a polarity opposite to the poling polarity of the transducer, wherein the biased bipolar voltage signal drives the transducer to generate an ultrasound wave.

2. The ultrasound imaging device as claimed in claim 1, wherein the bias generator is current limited.

3. The ultrasound imaging device as claimed in claim 1, wherein the ultrasound imaging device further comprises:
    a receiver to process an image signal; and
    a transmitter/receiver switch which transmits the bipolar voltage signal from the bipolar transmitter so that the bias generator generates the biased bipolar voltage signal, during a transmit cycle;
    wherein the transducer receives a reflected ultrasound wave from an object in response to the emitted ultrasound wave and converts the reflected ultrasound wave to the image signal so that the transmitter/receiver switch transmits the image signal to the receiver, during a receive cycle.

4. The ultrasound imaging device as claimed in claim 1, further comprising:
    an RC circuit between the transmitter/receiver switch, the bias generator and the transducer.

5. The ultrasound imaging device as claimed in claim 4, wherein the RC circuit comprises:
    a capacitor having a first end connected to the transmitter/receiver switch, and a second end connected to the transducer; and
    a resistor having a first end connected to the second end of the capacitor and the transducer and a second end connected to the bias generator.

6. The ultrasound imaging device as claimed in claim 1, wherein the transducer is a piezoelectric element.

7. The ultrasound imaging device as claimed in claim 1, wherein the bipolar voltage signal has a quiescent voltage at 0 volts and maximum and minimum values symmetrical about 0 volts, and the biased bipolar voltage signal has a quiescent voltage at least as positive as the minimum value of the bipolar voltage signal or at least as negative as the maximum value of the bipolar voltage signal.

8. The ultrasound imaging device as claimed in claim 7, wherein the transducer has a negative poling polarity and the bias generator prevents the biased bipolar voltage signal from being greater than 0 volts.

9. The ultrasound imaging device as claimed in claim 8, wherein the biased bipolar voltage has a maximum voltage which is a negative voltage.

10. The ultrasound imaging device as claimed in claim 7, wherein the transducer has a positive polarity, and the bias generator prevents the biased bipolar voltage signal from being less than 0 volts.

11. The ultrasound imaging device as claimed in claim 10, wherein the biased bipolar voltage signal has a minimum voltage which is a positive voltage.

12. The ultrasound imaging device as claimed in claim 1, wherein the bipolar voltage signal has a quiescent voltage at 0 volts and maximum and minimum values symmetrical about 0 volts, and the biased bipolar voltage signal has a quiescent voltage at least as negative as the maximum value of the bipolar voltage signal or at least as positive as the minimum value of the bipolar voltage signal.

13. An ultrasound imaging device comprising:

a transducer with a poling polarity;

a bipolar transmitter which generates a bipolar voltage signal; and a bias generator which biases the bipolar voltage signal, to generate a biased bipolar voltage signal from having a non-zero quiescent voltage, wherein the biased bipolar voltage signal drives the transducer to generate an ultrasound wave.

14. The ultrasound imaging device as claimed in claim 13, wherein:

the transducer has a negative poling polarity; and the bias generator biases the bipolar voltage signal to have a negative quiescent voltage at least as great as a difference between a maximum value of the bipolar voltage signal and 0 volts.

15. The ultrasound imaging device as claimed in claim 13, wherein:

the transducer has a positive poling polarity; and the bias generator biases the bipolar voltage signal to have a positive quiescent voltage at least as great as a difference between a minimum value of the bipolar voltage signal and 0 volts.

16. The ultrasound imaging device as claimed in claim 15, wherein the bias generator is current limited.

17. The ultrasound imaging device as claimed in claim 15, wherein the ultrasound imaging device further comprises:

a receiver to process an image signal; and a transmitter/receiver switch which transmits the bipolar voltage signal from the bipolar transmitter so that the bias generator generates the biased bipolar voltage signal, during a transmit cycle;

wherein the transducer receives a reflected ultrasound wave from an object in response to the emitted ultrasound wave and converts the reflected ultrasound wave to the image signal so that the transmitter/receiver switch transmits the image signal to the receiver, during a receive cycle.

18. A method of generating an ultrasound wave from a transducer having a poling polarity to provide ultrasound imaging, the method comprising:

generating a biased bipolar voltage signal which maintains a polarity the same as the poling polarity of the transducer during a transmit cycle; and supplying the biased bipolar voltage signal to the transducer, which drives the transducer to generate the ultrasound wave.

19. The method of claim 18, wherein the generating of the biased bipolar voltage signal comprises:

generating a bipolar voltage signal having a quiescent voltage of 0 volts and a positive maximum value and a negative minimum value; and biasing the bipolar voltage signal by at least a difference between the maximum value and 0 volts or 0 volts and the minimum value, according to the poling polarity of the transducer.

20. The method of claim 19, wherein the biasing of the bipolar voltage signal comprises:

biasing the bipolar voltage signal in a positive direction by at least the difference between the minimum value and 0 volts if the poling polarity of the transducer is positive.

21. The method of claim 19, wherein the biasing of the bipolar voltage signal comprises:

biasing the bipolar voltage signal in a negative direction by at least the difference between 0 volts and the maximum value if the poling polarity of the transducer is negative.

22. An ultrasound imaging device, comprising:

a transducer with a piezoelectric polarity;

means for generating a driving signal that drives the transducer to generate an ultrasound wave, the driving signal being based on a bipolar signal but having a polarity that is the same as the poling polarity of the transducer.

* * * * *